# United States Patent [19]

Lane

[11] 4,202,035
[45] May 6, 1980

[54] MODULO ADDRESSING APPARATUS FOR USE IN A MICROPROCESSOR

[75] Inventor: John H. Lane, Huntington Beach, Calif.

[73] Assignee: McDonnell Douglas Corporation, Long Beach, Calif.

[21] Appl. No.: 854,763

[22] Filed: Nov. 25, 1977

[51] Int. Cl.$^2$ ............................................. G06F 9/20
[52] U.S. Cl. .................................................... 364/200
[58] Field of Search ... 364/200 MS File, 900 MS File, 364/736, 746

[56] References Cited

U.S. PATENT DOCUMENTS

| | | | |
|---|---|---|---|
| 3,546,677 | 12/1970 | Barton et al. | 364/200 |
| 3,786,432 | 1/1974 | Woods | 364/200 |
| 3,943,495 | 3/1976 | Garlic | 364/200 |
| 3,949,378 | 4/1976 | Crabb et al. | 364/200 |
| 3,980,874 | 9/1976 | Vora | 364/746 |
| 4,047,247 | 9/1977 | Stanley et al. | 364/200 |
| 4,054,945 | 10/1977 | Ichiko et al. | 364/200 |
| 4,075,689 | 2/1978 | Berkling | 364/200 |

Primary Examiner—Melvin B. Chapnick
Attorney, Agent, or Firm—Henry G. Kohlmann; Walter J. Jason; Donald L. Royer

[57] ABSTRACT

A microprocessor with a two bus structure and modulo addressing hardware which converts any section of main memory into an apparent circular address space for use as a five-fold data register. The modulo addressing hardware has a capability for circularly loading data into a sequential order or accessing data repeatedly for the evaluation of recursive algorithms. Thus, the modulo addressing hardware is useful in the rapid processing of such recursive software algorithms and in the solution of various mathematical series. More generally, it is useful for the rapid access of any data in memory. The described microprocessor uses the modulo addressing hardware concurrently with the execution of data manipulation instructions. A 64 bit wide instruction allows control of both modulo addressing hardware and the microprocessor CPU in a single micro instruction.

14 Claims, 22 Drawing Figures

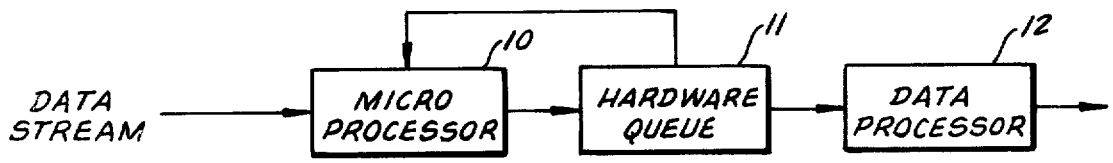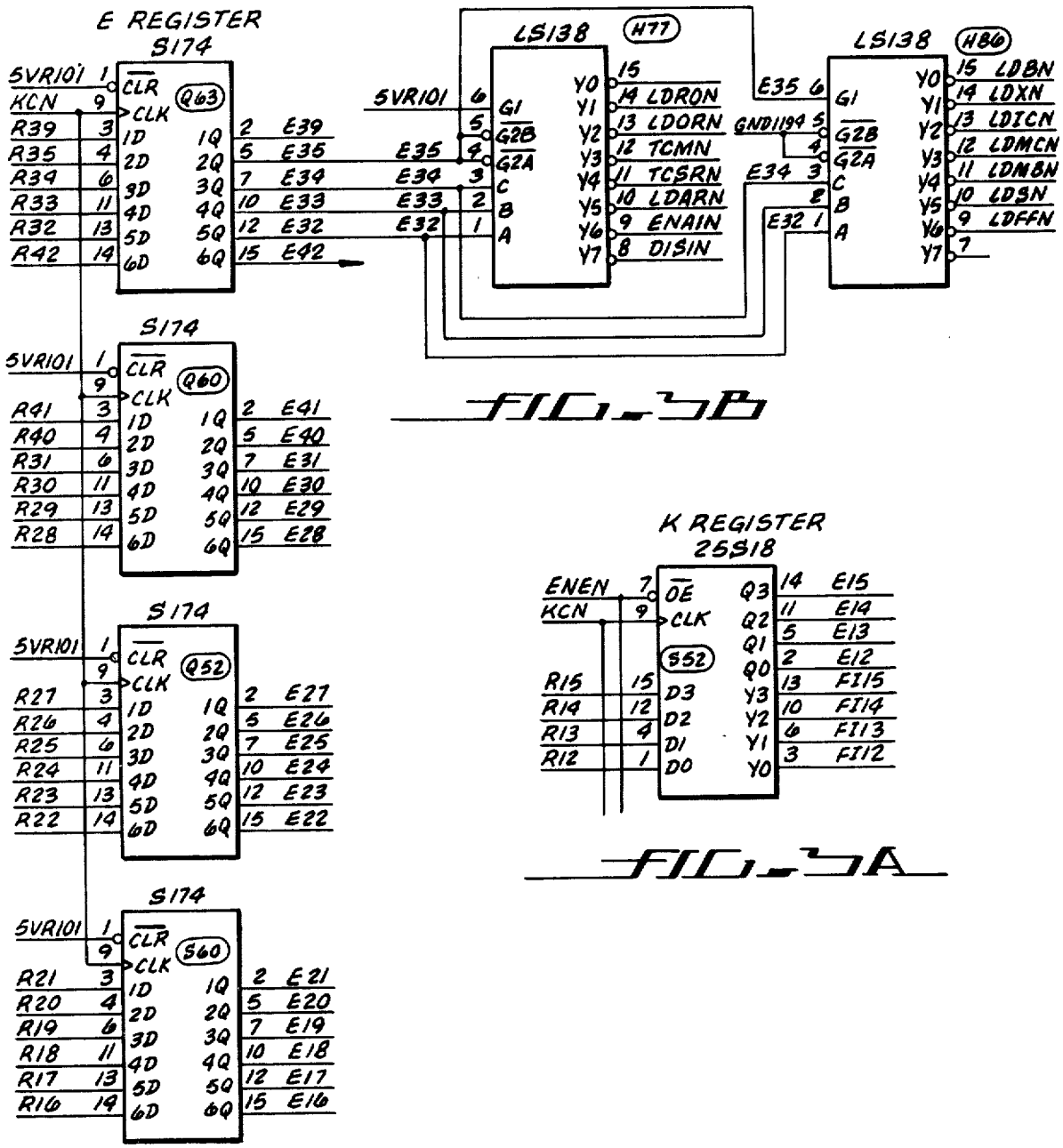

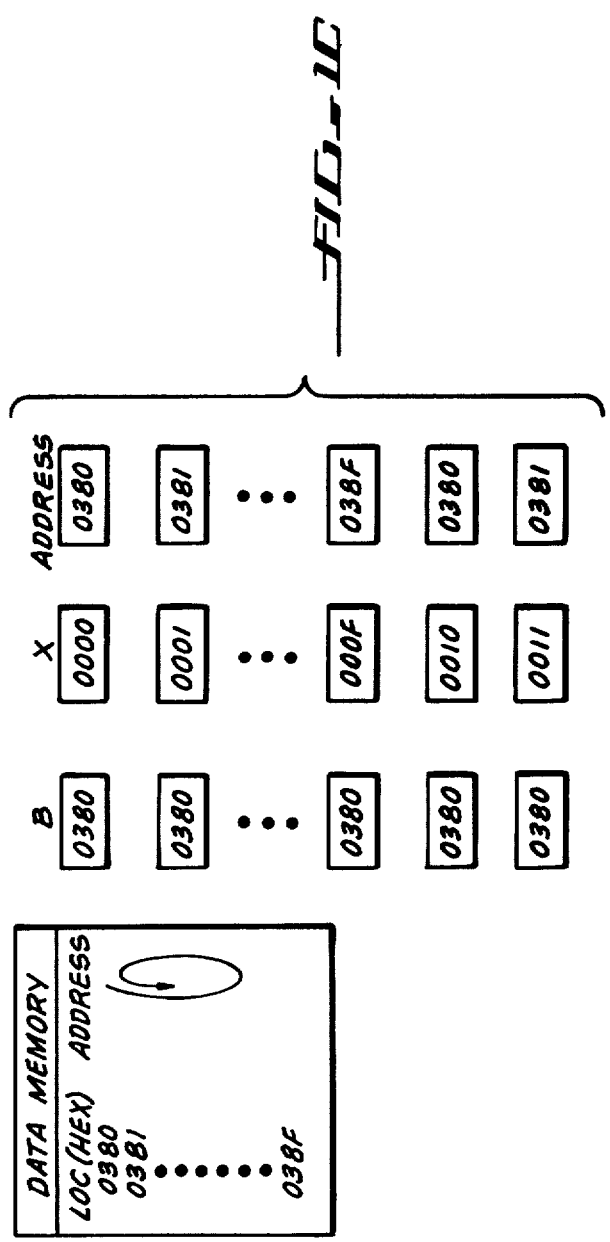

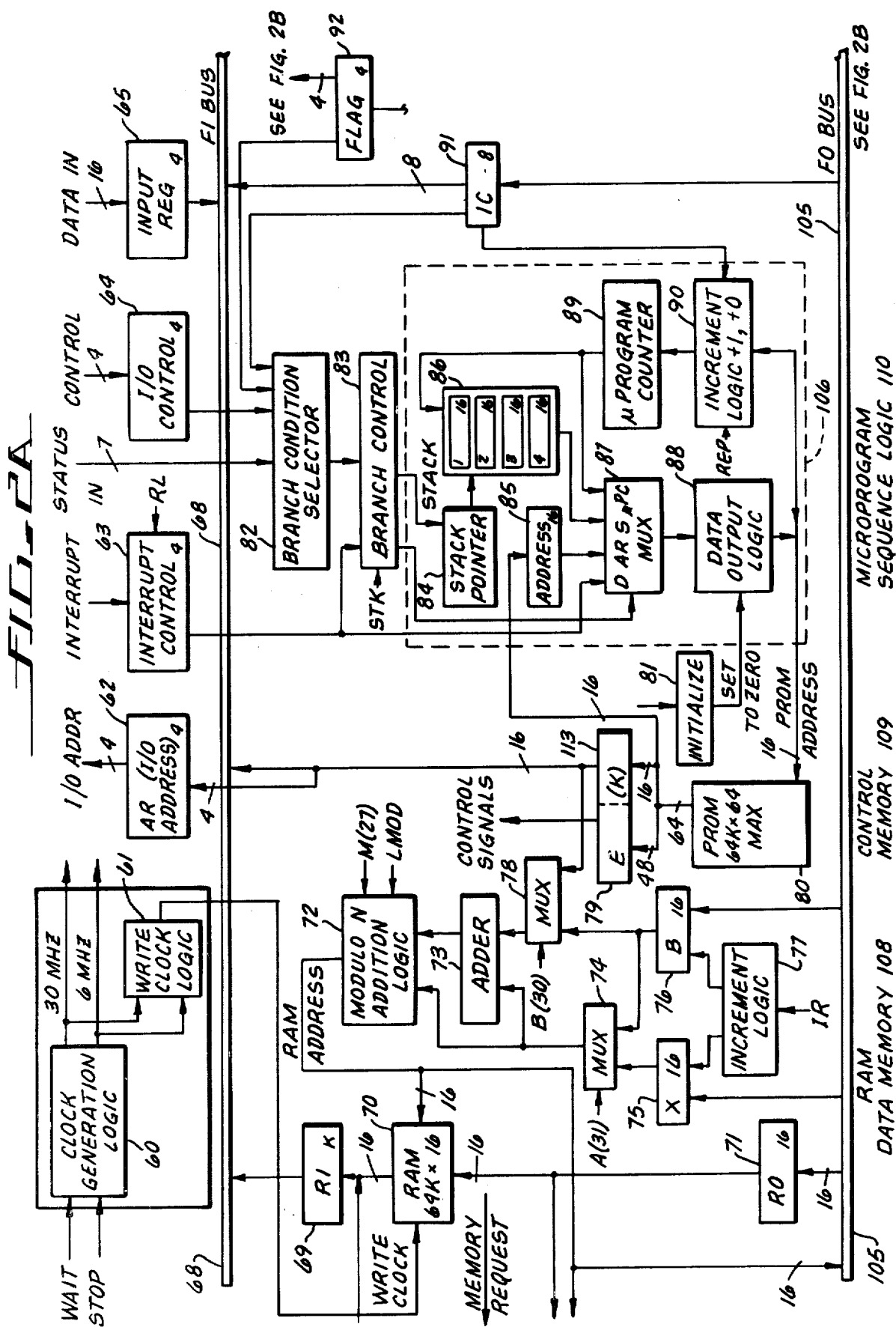

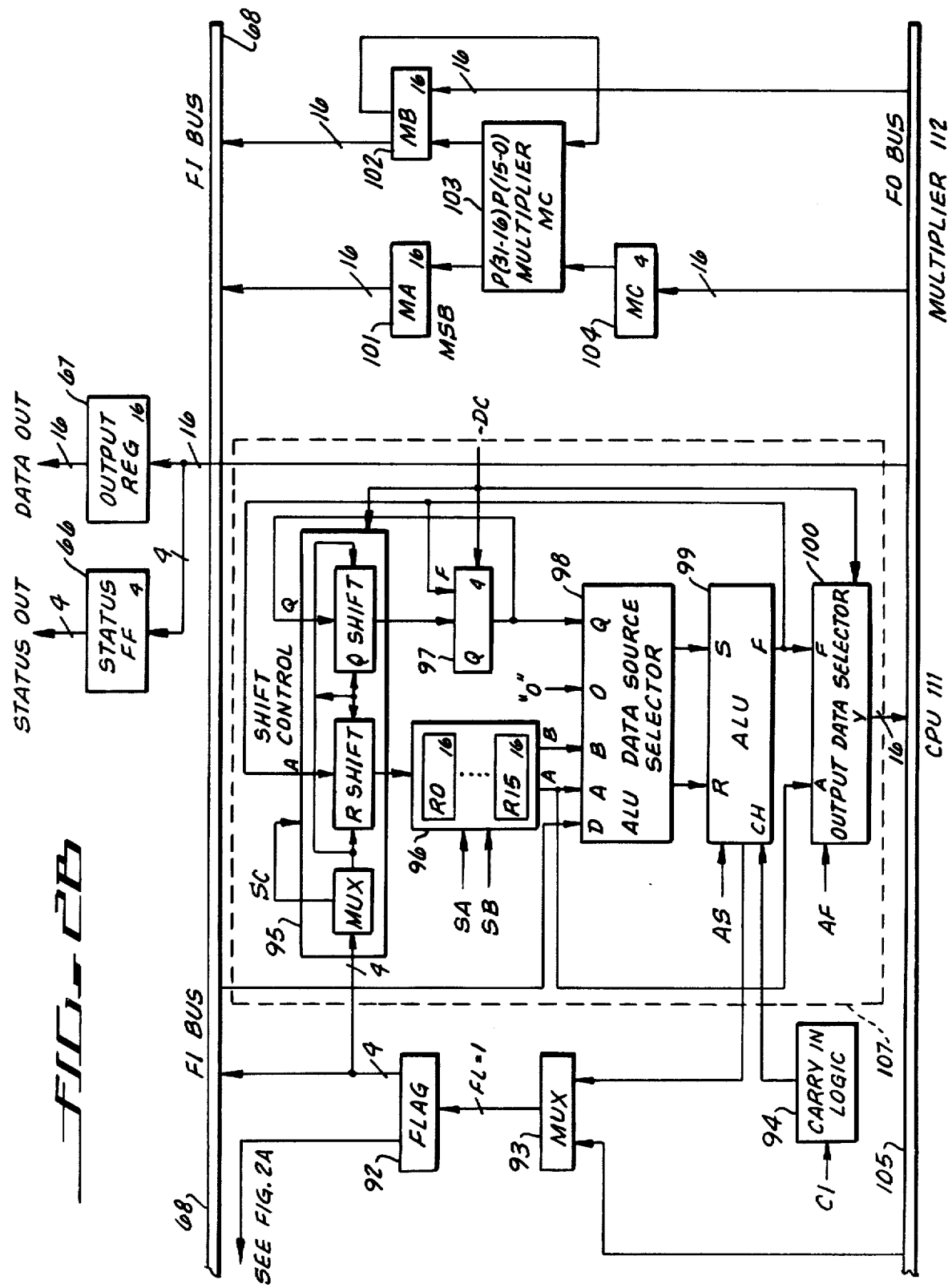

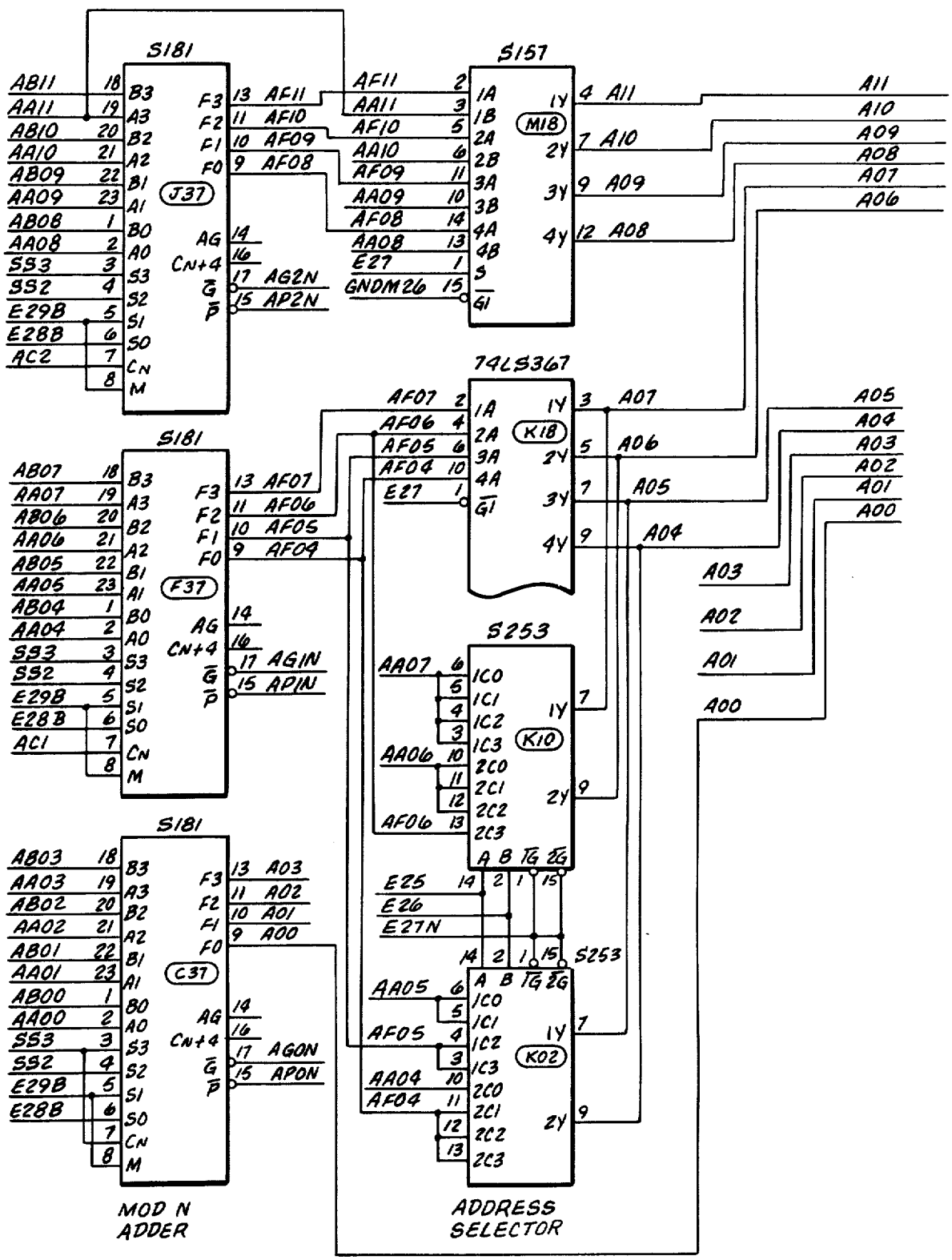
FIG_7

HARDWARE MULTIPLIER

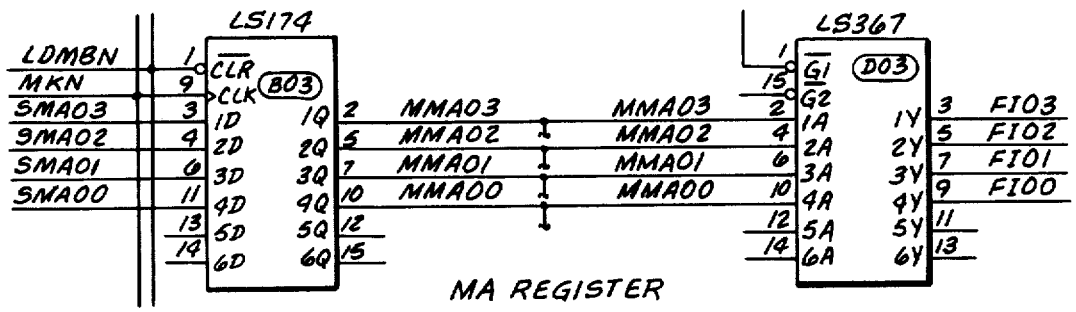
MA REGISTER
FIG_10A
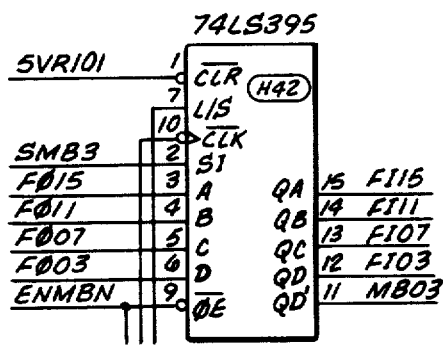
MB REGISTER
FIG_10B
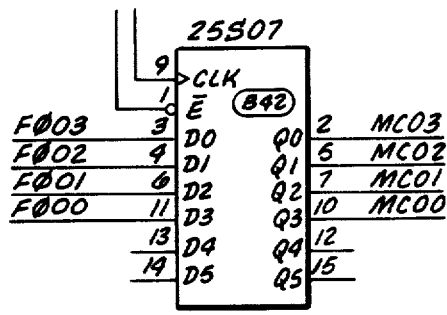
MC REGISTER
FIG_10C
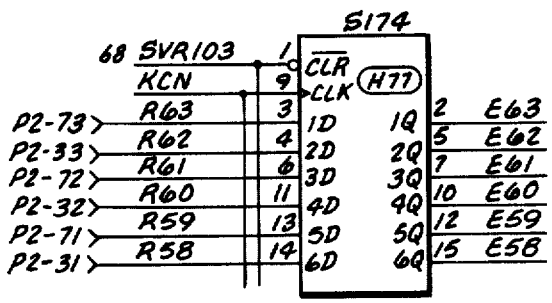
E REGISTER
FIG_12
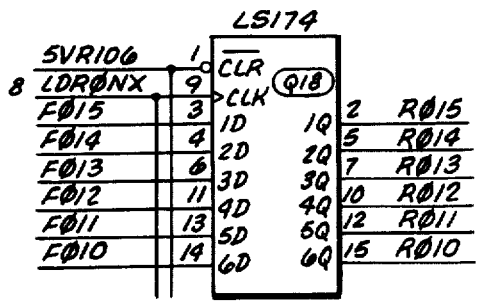
R0 REGISTER
FIG_13A
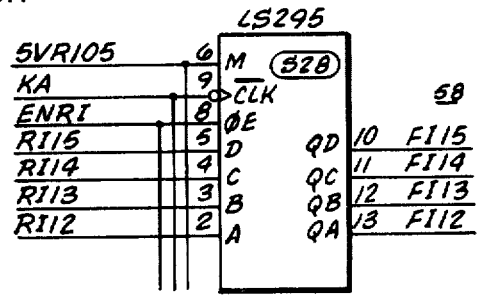
R1 REGISTER
FIG_13B

MODULO ADDRESSING APPARATUS FOR USE IN A MICROPROCESSOR

BACKGROUND OF THE INVENTION

This application describes the architecture of a microprocessor designed for high speed data reduction and more specifically describes a microprocessor where all major data-processing circuits are connected in parallel between the input and output busses, which contain control circuitry capable of controlling all of the data-processing circuits concurrently, and which contains a modulo addressing circuit for increasing the speed with which digital data words may be accessed from previously defined circular data word lists.

There is a continuing search for means for increasing the data processing speed of computers. The use of LSI components has increased processor speed since these components are smaller and have less capacitance, thereby decreasing travel time delays.

Other general methods of increasing data reduction speed are to design special purpose computer architectures incorporating additional hardware designed for a specific end use, or to rearrange the typical general purpose computer components to provide greater speed for particular applications.

A useful configuration would be a computer optimized for the digital filtering of data based on software containing a recursive algorithm, for the high speed execution of any program which requires the repeated use of prior data words received in a data stream to solve any kind of mathematical series computation, or for accessing any word in a finite circular list of words constructed from the input data stream on a first-in first-out (FIFO) basis.

SUMMARY OF THE INVENTION

The microprocessor described herein is constructed and arranged to perform high speed data reduction of an input data stream in accordance with any particular equation or algorithm. The specific algorithm itself is unimportant except insofar as it is the computation of one variable as a function of another and requires the use of previously processed data. The invention herein described is directed to a high speed microprocessor which provides a means for evaluating certain algorithms by providing the address of any particular data location desired while at the same time executing the data manipulation instructions. That is, the need for an instruction or instruction sequence to either compute or otherwise generate the address is eliminated. The modular addressing technique herein described allows the data to be manipulated by the central processing unit while the addressing apparatus itself generates the next address required. This device is retreiving all of the prior words needed to solve the particular algorithm used. In the present embodiment the single instruction used to initiate the modulo addressing operation may select a section of memory or initialize a section of memory of length $2^n$, where n may equal any positive integer of the set 4, 5, 6 and 7. This type of register may be viewed as a circular shift register having a shifting window theeon where as new data is added old data is lost. This then provides a list of the particular length specified containing a plurality of data points in historical order. Upon execution of the proper instruction the modular addressing hardware is initiated and hardware adders compute the location within the "FIFO shift register" which locates the data point desired.

Data reduction speed is also increased in the described embodiment through the use of a two data bus structure wherein all major processor components are arranged in parallel between said busses. Thus, several operations including the operation of the busses may proceed in parallel.

The object of the invention then is to provide in a micro-processor, modulo addressing hardware for increasing the speed of data reduction where there is a requirement for iteratively accessing prior words in the input data stream, by providing hardware capable of maintaining a circular buffer in data memory unaided by the CPU, freeing the rest of the data handling circuitry for the manipulation of the data accessed from the data memory. This modulo addressing hardware may be used to advantage in a micro-processor having a two data bus structure so that future data may be staged for use by the CPU while current data is simultaneously processed by the CPU and other components. The addition of control circuitry capable of concurrently controlling the data handling components permits the same processor to perform as efficiently as specially-designed processors for each application in the range of applications (as described above) for which it was designed.

BRIEF DESCRIPTION OF THE DRAWINGS

FIG. 1A is an example of a system in which this computer may be used to advantage;

FIG. 1C is an illustrative diagram of the modulo addressing sequence;

FIGS. 2A and 2B are a detailed block diagram of the microprocessor;

FIG. 3A is a circuit diagram of the K register;

FIG. 3B is a circuit diagram of the E register.

FIG. 7 is a circuit diagram of the Mod N adder and address selector;

FIG. 10A is a circuit diagram of the MA register;

FIG. 10B is a circuit diagram of the MB register;

FIG. 10C is a circuit diagram of the MC register;

FIG. 12 is a circuit diagram of the E register;

FIG. 13A is a circuit diagram of the RO register; and

FIG. 13B is a circuit diagram of the RI register.

FIG. 14 is a diagram of the instruction word fields.

DETAILED DESCRIPTION OF THE INVENTION

Figure 1B:
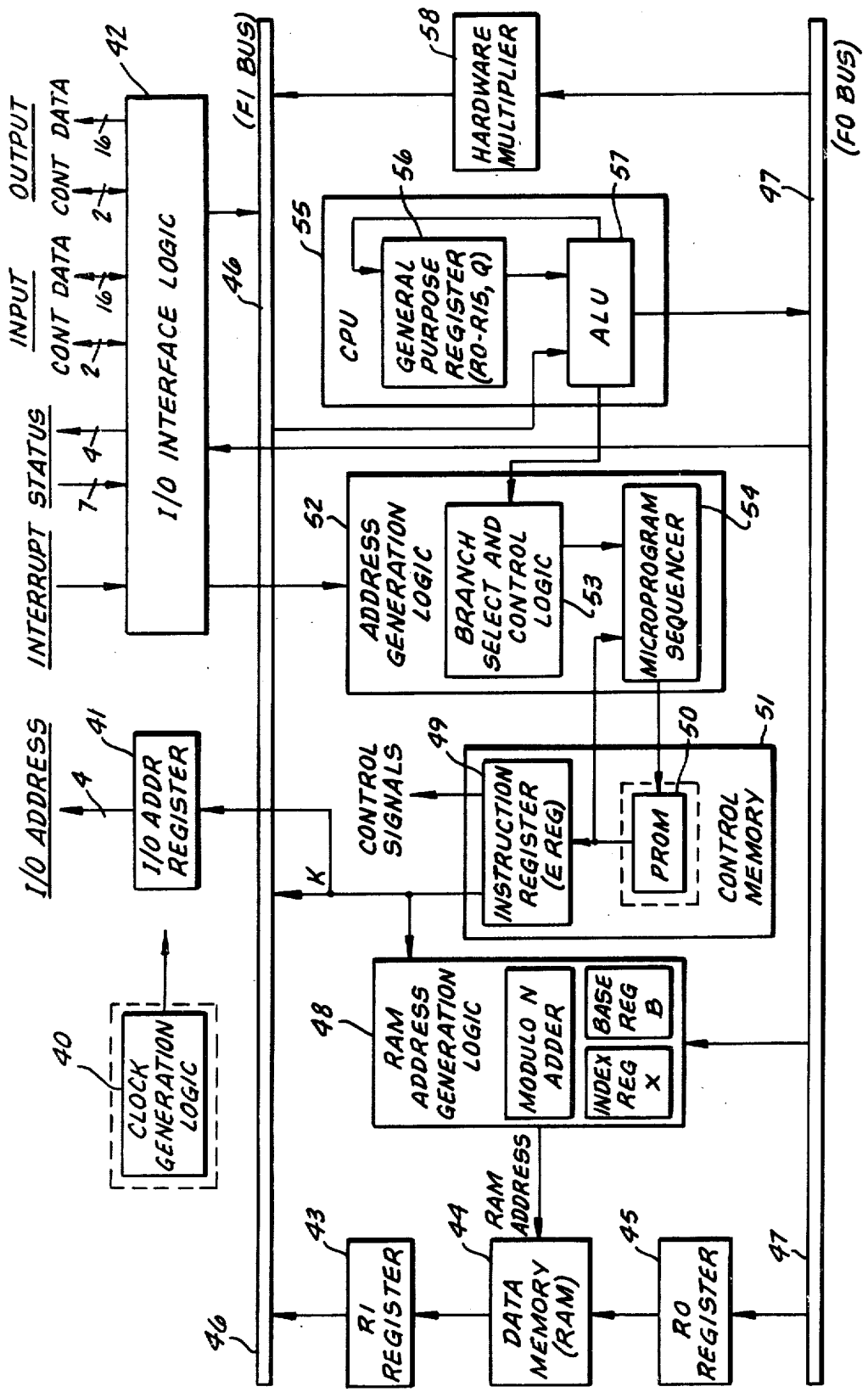
FIG. 1B is an overall block diagram of the microprocessor.

The microprocessor described in this application may be used to advantage in any system where there is a requirement for high-speed real time data reduction. A typical use would be in a data pre-processor where a high bit rate data stream must be decommutated, filtered, thresholded or otherwise simplified, and manipulated to put the data into a form, and to reduce the data rate to a level that can be operated on by a general purpose data processor.

FIG. 1A is a simplified block diagram of a system in which this micro-processor could effectively be used, and is the system for which this micro-processor was designed.

A data stream of approximately one million bits per second is received by the micro-processor 10. In this described embodiment, the data is received from a large number of infra-red sensors in series (but not in a preset order), and contains noise and other unwanted sensor outputs that must be eliminated. First, the inputs are decommutated in order to separate the individual sensor signals and store them in separate circular sections of data memory. Digital representations of each filtered sensor output history are statistically compared to a digital equivalent of an amplitude threshold, and the smaller noise and pulse inputs are deleted. Then, the signals are digitally filtered to attenuate those input frequencies that are above or below those of the desired signals. The filtered and thresholded, decommutated sensor signals are then temporarily stored in a FIFO hardware queue 11 at an input rate of about four hundred thousand bits per second. As described, this queue will contain the individual sensor histories corresponding to the regions which meet the spectral and threshold requirements of the algorithm.

The data processor 12 performs data reduction at its rated speed. When it has finished processing one block of data corresponding to one sensor history, another is requested from the queue. To the extent that the data is being loaded into the queue faster or slower than the data processor can process it, the queue will become more or less full. To compensate, a fullness indication is supplied from the queue 11 to the micro-processor 10 to raise or lower the threshold, thus slowing down or speeding up the rate at which the queue is filled. In this way, the queue will always remain about half full, and the data processor 12 will always be processing data at its rated speed.

The microprocessor of FIG. 1A must be designed to be capable of processing data at high speed to perform the thresholding operation. Additionally, since the filtering algorithm requires the iterative use of previously received values, a rapid method of accessing these values must be provided. As noted before, the microprocessor is based on the advance Micro Devices AM 2900 series four bit bi-polar microprocessor chip set and is supported with Shottky TTL IC logic components. It may be noted that the instruction word is divided into control fields for convenience. In particular the address generation and window selection may be made by particular control words within the control word fields. First, all major microprocessor components are arranged in parallel between two busses to allow for parallel operations. Second, modulo addressing hardware is provided to allow high speed access to previously received data.

The overall operation of the preferred embodiment of the microprocessor may be described with reference to the simplified block diagram of FIG. 1B.

In general this processor is a high speed (167 nanosecond cycle time) microprogrammed 16 bit processor capable of performing fixed point arithmetic and logical operations. It is based on the Advanced Micro Devices, AM 2900 series, 4-bit bipolar microprocessor chip set and is supported with Schottky TTL IC logic components.

The processor includes a 16 bit CPU 55 comprising sixteen general registers 56 including an accumulator, an index register, a base register and a plurality of scratch pad registers. The 16 bit ALU 57 receives its inputs from a register 56 and from the FI bus 46 and outputs onto the FO bus 47. Two alternative output paths from the ALU are back to a register 56 or to address generation logic 52.

The hardware multiplier 58 multiplies two 16 bit numbers, producing a 32 bit product either half of which can be output onto the 16 bit FI bus, in a total of 667 nanoseconds.

This processor is controlled by a 64 bit wide microprogram contained on PROM's 50 in the control memory 51. The 64 bit output is loaded into an instruction register 49 and is used to control the processor in the usual way.

The address generation logic 52, including branch select and control logic 53 and a microprogram sequencer 54, generates the address of the next instruction to be executed in the PROM 50. The next address may be the next in sequence or may be the result of a branch instruction based on the contents of the ALU 57 output.

Each microprocessor forming the entire processor herein described has a 2K by 16 bit bipolar read/write random access memory (RAM) 44. Associated with such memory is an independent Ram address generation logic 48 which is described in greater detail hereinafter. Data may be transferred from the FO bus 47 through the RO register 45, through the RAM 44, and through the RI register 43 to the FI bus 46. Each transfer (i.e. from RAM 44 to RI register 43) takes one cycle time of 167 nanoseconds.

Typical clock generation logic 40 is provided. An I/O address register 41 is provided to address external circuits. Input/Output interface logic 42 is provided to input and output data and control signals for coupling to the FI bus 46 and the FO bus 47, and for coupling interrupt information to the address generation logic 52. The method of operation is as follows: With reference to FIG. 1c, one address register (B) holds the base address of the array to be used for the window, the other (X) holds the index. The data memory address is computed by the modulo adder according to the following relationship: $b(2^{16}-2^n)+$ modular $(b+i, 2^n)$ where b is the contents of the B register and i is the contents of the X register. If the array is located so that its base address is zero mod $2^n$, that is, the lower end digits of the B register equal zero, then $b(2^{16}-2^n)$ is the upper $16-n$ digits of the base address and mod$(b+i, 2^n)$ is the lower n digits of the address of the desired data inside the array. That is, the modulo circuit generates an address which is the result of the addition of the lower n digits of the B and the X register and the upper $16-n$ digits of the B register. In fact the lower n digits are added modularly thereby generating a circulating address. The particular modulo is specified by a control field 9 of the control word. In FIG. 1c, for example, the B register contains the address 0380 and the X register initiated at 0 the modular addressing hardware would cause the X register to be incremented continually and added modularly to the B register to form the address. When the X register is incremented above the modulo range only the lower end bits are added to the B register which causes the recirculation of the address within the window.

A detailed block diagram of the processor is shown in FIGS. 2A and 2B. The processor consists of a control memory 109, microprogram sequence logic 110, data memory (RAM) 108, processing unit (PU) 111, hardware multiply logic 112, I/O interface logic 63 through 65, and clock generation logic 60 associated with write clock logic 61. Data transfer within the processor is performed on two busses, the FI bus 68 and the FO bus 105.

The microprogram or control memory 80 is a bipolar programmable read-only-memory (PROM) and contains the microprogram instruction words. During each processor cycle (167 nanoseconds) a new micro instruction is loaded from the PROM into the Instruction Register (E Register) 79. Each micro-instruction word is 64 bits wide and the least significant 16 bits contain either an address or data (constant) which is loaded into the K register 113. The upper 48 bits contain control fields which select the various operations to be performed by the processor. The operations include selection of data flow within the processor, ALU operations, address generation and microprogram branch conditions.

The loading of instructions into the E register 79 and data into the other registers within the processor, as well as execution of the instructions, are synchronized to the low to high transition of the 6 MHz processor clock pulse (167 nanosecond cycle time) output of the clock generation logic 60.

After a clock pulse loads a new instruction into the E register 79, the processor enables the data from the selected registers onto the various data buses and initiates the selected processor operations. The register data and the data resulting from the processor operations (e.g. ALU ADD operation) are routed to the input of the selected destination registers and loaded into the registers on the next clock pulse. This clock pulse also loads the next instruction into the E Register 79 initiating a new instruction cycle.

The address of the microprogram instruction to be loaded into the E Register is generated by the microprogram sequence logic 110. The major portion of this logic, that enclosed in dotted line 106, is implemented from Advanced Micro Devices part number AM 2909 parts which includes an address register 85, a multiplexor 87, data output logic 88, and increment logic 90 initialized on restart or power up by initialize 81.

The sequence logic includes a microprogram counter (MPC) 89 which is automatically incremented to generate the next address. The sequence logic also includes branch selection and control logic 82 and 83 which allows the microprogram to branch to another address when a particular branching condition selected by the microprogram instruction occurs this includes, of course, evaluation of the flags 92 which are set in response to various processor operations as is well known. The branch address may be selected either from the address portion of the instruction, K, or from the top of the push/pop address stack 86. An instruction may be repeated by inhibiting the micro-program counter 89 from incrementing. The instruction will repeat until a branch condition is met or the IC register 91 reaches a maximum count of 255. The push/pop stack 86 is used when branching to a subroutine. The return address is automatically stored in the top of the stack and other return addresses already in the stack are pushed down one position (push operation) and a stack pointer 84 is set. When returning from the subroutine, the return addresses in the stack are moved up one position (pop operation). Since the stack contains four words, up to four microprogram subroutines can be nested.

When an interrupt condition is accepted by the processor, the sequence generation logic 110 output address is forced to zero and the next instruction will be loaded into the E Register 79 from the control memory (PROM) 80 location four. The return address is automatically pushed into the stack 84. Control memory location four must contain a branch instruction to an interrupt service routine.

The data memory address generation logic 72 through 78 includes multiplexers 78 and 74, and an adder 73 to generate the RAM address from various combinations of the index (X) register 75, base (B) register 76, and the address field of the instruction (K) register 113. Also, special modulo addressing logic is included to perform modulo 16, 32, 64 and 128 addition of the RAM address that permits repeated addressing of a 16, 32, 64 or 128 word block of data with a minimum of microprogram instructions. The base register 76, can be incremented or decremented every cycle under microprogram control while the index register 75, can only be incremented.

The data memory consists of bipolar, static, read/-write random access memory components (RAM) 70. One complete instruction cycle (167 nanoseconds) is required to access the data memory. During an instruction cycle, the RAM address is generated, the data is accessed from the RAM, and is then loaded into the RAM Input (RI) Register 69 on the rise of the next clock pulse. The data in the RI Register now may be enabled onto the FI bus 68 for use within the processor. This data in the RI Register will be good for only one cycle since, on the next cycle, it will be overwritten.

One complete instruction cycle is required to write data into the RAM 70. The data must be first loaded into the RAM Output (RO) Register 71, from the FO bus 105. During the write instruction cycle, the RAM address is generated and the RAM write operation is enabled. The data from the RO Register 71 is written into the RAM 70 by the "Set RAM Clock" which occurs 67 nanoseconds before end of the write instruction cycle to assure that the RAM write operation is completed by the end of the write instruction cycle.

The CPU portion 111 of the processor includes an Arithmetic Logic Unit (ALU) 99, ALU data source selector logic 98, shift control logic 95, 16 general purpose registers (R0 through R15) 96 an output data selector 100, and a Q Register 97. The majority of the PU logic is contained on four AM 2901 microprocessor chips.

The ALU has the capability to perform 8 different functions on two 16 bit data inputs (R and S) resulting in a 16 bit output (F). The functions include addition, two subtraction operations and five logic functions.

The source of the ALU 99 inputs, R and S can be selected from various combinations of the following: a direct input from the FI bus 68; any two of the 16 general registers 96 (R0 through R15) on the general register output ports A and B; Q register 97 output; and a zero. During arithmetic operations, the four status flags can, if desired, be stored in the flag register 92 through multiplexor 93 from the ALU 99 or the FO bus 105. The status flags carry (c), overflow (o), zero (z) and sign (n), may be used as branch conditions.

The 16 general registers 96, R0 through R15, comprise a 16 word by 16 bit RAM with two address inputs, SA and SB, and two output ports A and B. Independent, simultaneous access to any two of the 16 registers is allowed. The address SB is also used for writing data from the ALU 99 data output, F, into the selected register. The shift control logic allows shifting of the ALU data output, F, one bit position (to the left or right) before the data is stored in the general register 96.

The 16 bit Q register 97 may be used as an accumulator, a holding register or as an extension of a general register for 32 bit shift operations. The Q register is also loaded from the ALU output F. The Q register output may be shifted right or left one place and loaded into the Q register.

The output of the CPU 111, Y, may be selected as either from the ALU output, F, or directly from the general register output, A. The PU output, Y, is enabled onto the output bus 105 at all times except when the microprogram instruction enables the output of the RAM address generation logic to the FO bus.

The hardware multiply logic uses a 2's complement time-sequenced multiply technique and requires four cycles (667 nanoseconds) to perform a 16 bit×16 bit register-to-register multiplication. The two 16 bit operands first must be loaded into the registers MC 104 and MB 102 from the FO bus 105. The MB register must be loaded with a multiplier first, since the multiplication process is initiated by loading the multiplicand into the MC register. Four cycles later a 32 bit product will be available in registers MA 101 and MB 102 with the most significant bits in the MA register. The multiplicand in the MC register will remain unchanged. As soon as the multiplication is initiated, the processor may perform other operations in parallel as long as the MC and MB registers are not disturbed.

The processor I/O interface includes a 16 bit parallel input register 65, a 16 bit output register 67, a 4 bit status output 66, a 7 bit status input to branch condition selector 82, a 4 bit I/O address output 62 and an interrupt input 63. All control inputs and the status inputs to the processor are synchronized to the low-to-high transition of the 6 MHz processor clock 60.

The remaining figures are schematics of the microprocessor circuits required to implement the modulo addressing function and the two bus structure of the preferred microprocessor embodiment. In order to simplify these schematics, clearly redundant material has been omitted. For instance, where a sixteen bit register is fabricated from four identical four bit register parts, only one part is shown in the schematic.

Figure 2C:
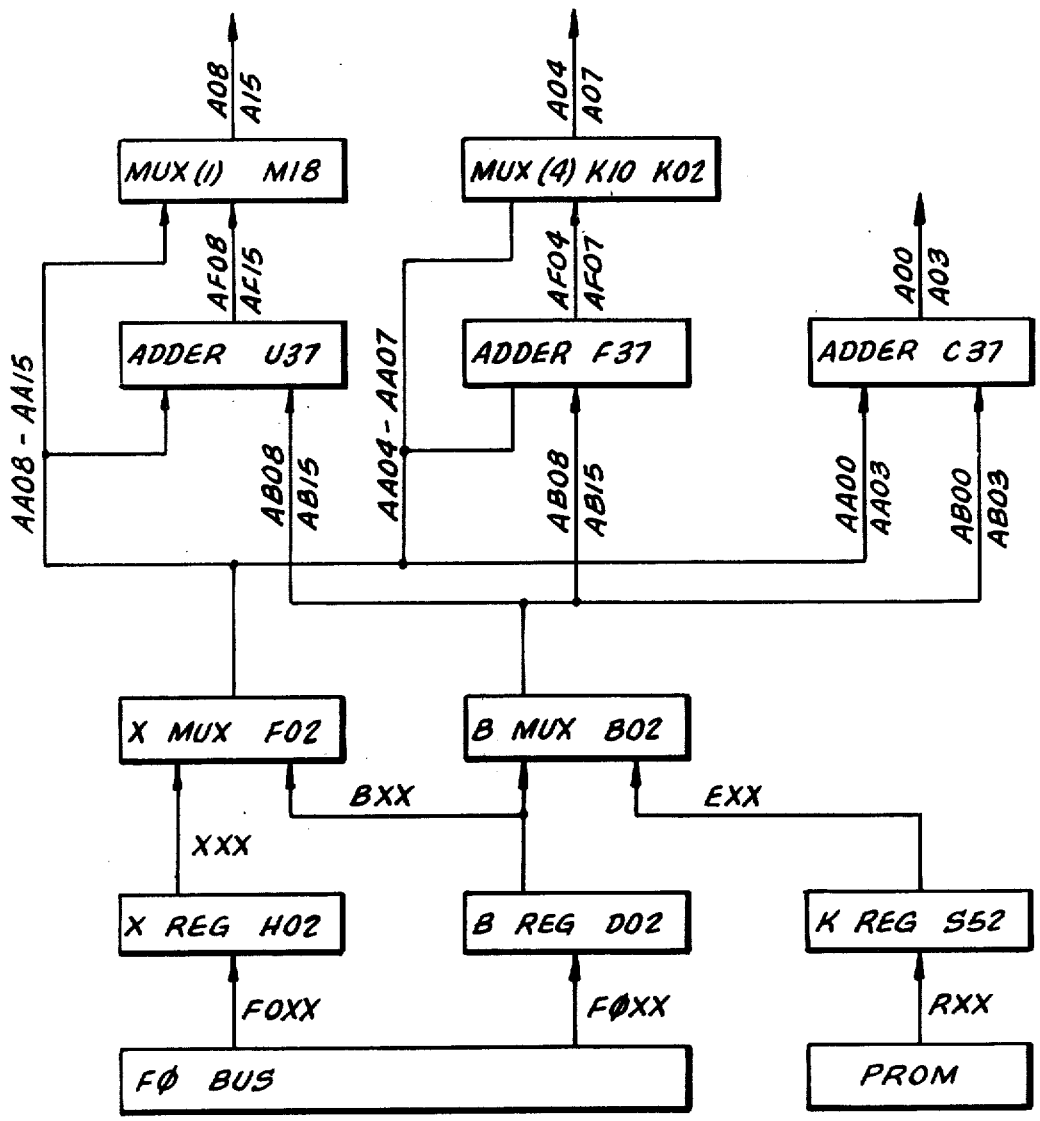
FIG. 2C is a simplified schematic diagram of the modulo addressing circuit.

FIG. 2C is a simplified schematic of the circuit which generates main memory addresses for use during either read or write operations. During normal operation, the base or B register D02 contents and the index or X register H02 contents are added to produce the effective address. Referring to FIG. 2C, the base address is coupled from the B register D02 through the B multiplexer B02 and the index data is coupled from the X register H02 through the X multiplexer F02, to the adder U37, F37 and C37. These values are added and the effective address is coupled out through multiplexers M18, K10 and K02 to the main memory on lines AXX forming the addresses as exemplified by FIG. 1c.

In the modulo addressing mode, a section of memory, from sixteen to one hundred twenty-eight words long, is designated as a word list, and any location within the list is immediately accessible. This is accomplished by loading the last word address into the B register D02 and a number representing the position of a desired data word relative to the position of the most recent data word loaded hereinafter the last data word or the last data word loaded into the K register S52. In this case the last word address is the most recently stored data word address or the last computed modulo sum of the B and X registers. It should be noted at this point that more than one FIFO register can be created in memory one for each different set of data values. Thus, the effective address computed for any given address must be stored for later retrieval when it is desired to operate on different data lists. If only one data list is operated on then, of course, the last data value address will have remained resident in the B and X registers; thus, the address need not be loaded. These decisions, however, involve the programming technique which utilizes the novel apparatus and not the apparatus per se. For a numerical example, if the list is contained in the first 64 locations of memory, the last word loaded is in location 40 and the desired word is the eighth from last, B=40 (the X register, of course, being zero) and K=8. The adder then adds B to the 2's complement of 8 to calculate the effective address, 32.

This is accomplished as follows. The last address is loaded from the FO bus into the B register and is available to the adder through the X multiplexer F02 on lines AAXX. The word list increment number representing the position of a desired data word relative to the position of the last data word loaded is loaded from the control memory PROM into the K register S52 and is available to the adder through the B multiplexer B02 on lines ABXX.

Since the largest list is one hundred twenty-eight words, the most significant eight address bits will not change during modulo addressing. In FIG. 2C, the eight bit multiplexer M18 will select the AAXX lines. Therefore, the most significant eight bits will be those in the B register.

The least significant four bits will always be a function of the word list increment during modulo addressing. In other words, during modulo addressing operations, the smallest word list size is sixteen, so that the 2's complement of the contents of the K register S52 on lines ABXX will always be added to the B register contents on lines AAXX. The resultant address bits are supplied on lines A00 through A03.

The use of this circuit is iterative in that, to access another location in the list on the next main memory access, all that need be changed is the contents of the K register S52. For example, if the first access is of word number 20 on the list, and the next access is of word number 15, the operation is repeated after the K register S52 contents is increased by 5.

The word list length is variable between 16 and 128 words in this embodiment. This means that lines A04 through A07 may be loaded either from the adder, or from the B register only, depending on the list size. To provide this flexibility, four multiplexers in two parts, K10 and K02, are provided.

The list is originally loaded with data words from the FO bus, as shown in FIG. 2A, while simultaneously the address generation logic described above produces the addresses. As the list is loaded, the current address is held in the B register. Therefore, during modulo addressing, the last 16, 32, 64 or 128 values received are accessible as word lists.

These word lists are circular in that a predetermined section of memory, 16 to 128 words in length is set aside for storing a list of data. During loading, i.e., storing of data, of such memory locations the modulo addressing apparatus computes the next sequential address during loading of the current address location until the highest possible address has been loaded. Upon loading the highest possible address the modulo addressing then computes the lowest possible address and begins loading data over previously loaded data. In this way the 16 to 128 most recently loaded data words are always resident within the list. The last computed address identifies the location of the most recently loaded word.

During accessing of the desired word or words the last computed address is used along with a delta or offset value introduced through the K register and the modulo address proceeds as before using the offset value as well and can compute every 8th, 16th or other number of the most recently loaded value as needed.

As a numerical example, assume a list in the first 64 words of memory. The list is repeatedly filled from location 1 to location 64. At a certain moment, the current value is 20. Now, if items Y-16 and Y-32 are needed, the locations 04 and 52 will be calculated. This cyclical feature is implemented by not providing the adder of FIG. 2C with a carry. Thus, every underflow results in a return to the top of the list.

In FIG. 3A, a four bit section of the sixteen bit K register S52, is shown, the K register being the least significant 16 bits of the instruction register for storing the output of the control memory. One set of outputs, FI00 through FI15 is routed to the FI bus so that a constant can be loaded onto the FI bus from control memory. The other sets of outputs, E00 through E15, is used for modulo addressing.

The E register in FIG. 3B, Q63, Q60, Q52 and S60 drives control lines that control the various processor elements. These bits are divided into subfields which are either used directly or are decoded before use. Decoders H77 and H86, for instance, decode the four bit subfield which controls loading and unloading the main memory and associated RI and RO registers into fourteen options.

Figure 4:
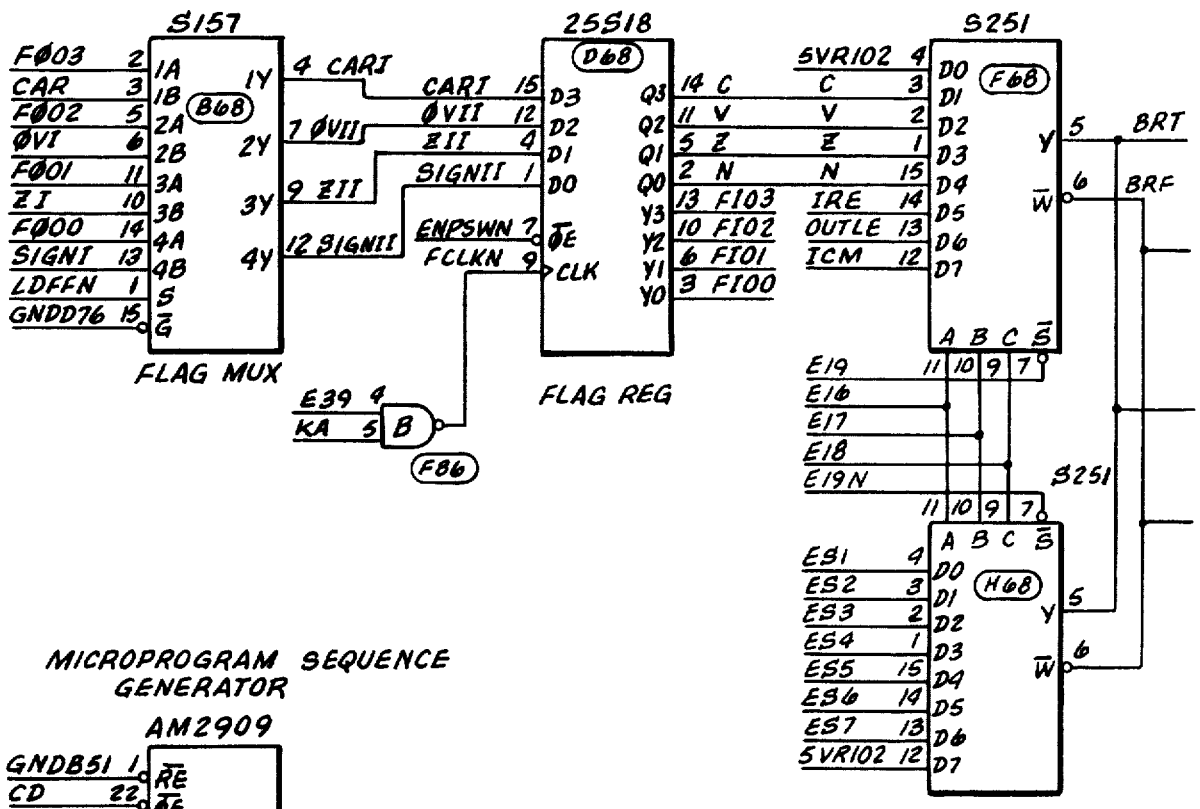
FIG. 4 is a circuit diagram of the flag multiplexer.

FIG. 4 shows the flag multiplexer B68 which loads from either the FO bus or from the ALU, the carry, zero, overflow and sign bits into the flag register D68. This flag data then is available to the FI bus on lines FI00 through FI03 or to the branch condition selector F68 and H68. The branch condition selector also can select status input information on lines E51 through E57 from the status register, and is controlled by lines E16 through E19 from the operation register.

Figure 5:
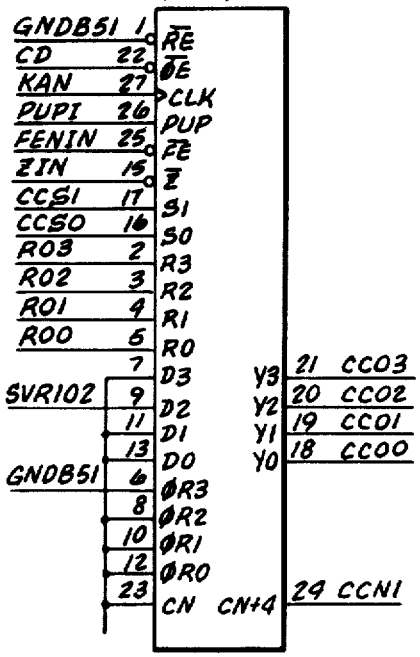
FIG. 5 is a circuit diagram of the microprogram sequence generator.

The part shown in FIG. 5 is one of three AM2909 parts used as the microprogram sequence generator. Branch control information bits are received from the branch control register, CC50 and CC51, and control memory, R00 through R11, and the 12 bit next address is output on lines CC00 through CC11 to the control memory.

Figure 6A:
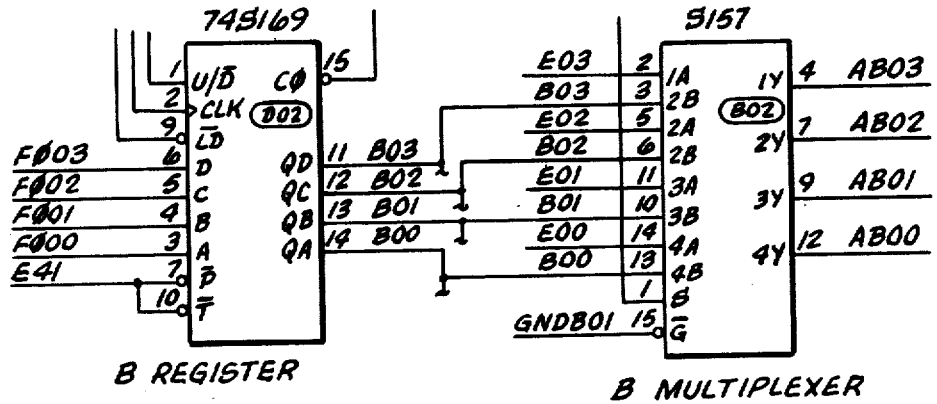
FIG. 6A is a circuit diagram of the B register and multiplexer.
Figure 6B:
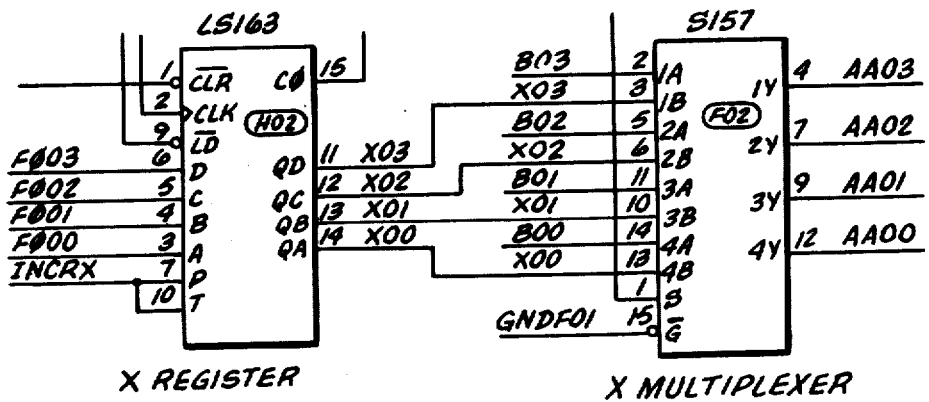
FIG. 6B is a circuit diagram of the X register and multiplexer.

FIG. 6A is a schematic diagram of the 16 bit base or B register D02 and the B multiplexer B02, and FIG. 6B is a schematic diagram of X register H02 and the X multiplexer F02. These registers both are loaded from the FO bus. The X multiplexer B02 receives inputs from the X register H02 on lines X00 through X15, and the B register on lines B00 through B15, and outputs to the modulo addition logic and adder on lines AA00 through AA15. The B multiplexer F02 receives bits from the B register on lines B00 through B15, or from the K register on lines E00 through E15, and outputs to the adder on lines AB00 through AB15.

FIG. 7 is the adder, J37, F37 and C37. The inputs from the X multiplexer, AA00 through AA15, and B multiplexer AB00 through AB15, are added and the 16 bit output is used to address the main 64K RAM memory on address lines A00 through A15. During modulo addressing, the most significant eight bits bypass the adder and determine which 256 word section of memory is being addressed. Any modulo addressing must thus be accomplished within this 256 bit area or window.

The actual amount of main memory addressable by the modulo addressing circuitry is either 16, 32, 64 or 128 words determinable by control lines E25 and E26 which control four multiplexers contained in parts K10 and K02. These multiplexers are arranged so that either one, two, three or four lines are coupled from the X multiplexer and the remainder from the adder. In the modulo addressing mode, the X multiplexer couples the current memory address and the K register contents is coupled to the adder through the B multiplexer. Therefore, if the most significant bits of A04 through A07 are coupled from the X multiplexer, these bits will not change. On the other hand, bits A04 through A07, which are coupled through the adder, will be different each time, depending on the contents of the K register. In a numerical example, if the K register contains a 16, then the calculated address will be 16 less than the base address. However, there is no carry option so the addressing mode is circular, when the bottom of the list is reached, the addressing automatically cycles to the top again. The size of each step in this addressing mode, then, is determined by the content of the K register while the window size is determined by the control memory through lines E25 and E26. In a numerical example, if the window size were 64 locations, the increment, is loaded into the K register was 16 and the current address was 2140, the address that will be generated is 2124. Since hardware, instead of software, is used to generate these addresses, the speed of operation can be faster, allowing for faster solution of recursive data reduction equations.

This modulo addressing circuit is particularly useful in connection with the overall architecture of the microprocessor which incorporates a two bus structure. Thus, for example, modulo addressing calculations in the hardware may proceed in parallel with arithmetic or logical operations in the ALU hardware multiplier, next address generator, or control memory.

Figure 8:
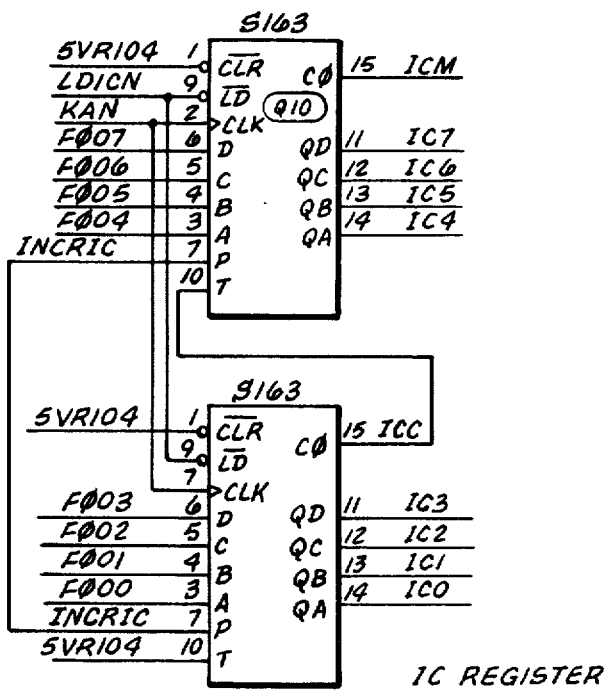
FIG. 8 is a circuit diagram of the IC register.

FIG. 8 is a schematic of the instruction counter (IC) which is shown as the IC register 91 of FIG. 2A. This counter has a maximum count of 256, output on lines IC0 through IC7, which is supplied to the branch condition selector 82. An instruction can be repeated until the IC register reaches a count of 256, at which time the branch condition selector will generate a branch condition. To make the IC register variable, an initial count is loaded in on lines FO00 through FO07 from the FO register.

Figure 9:
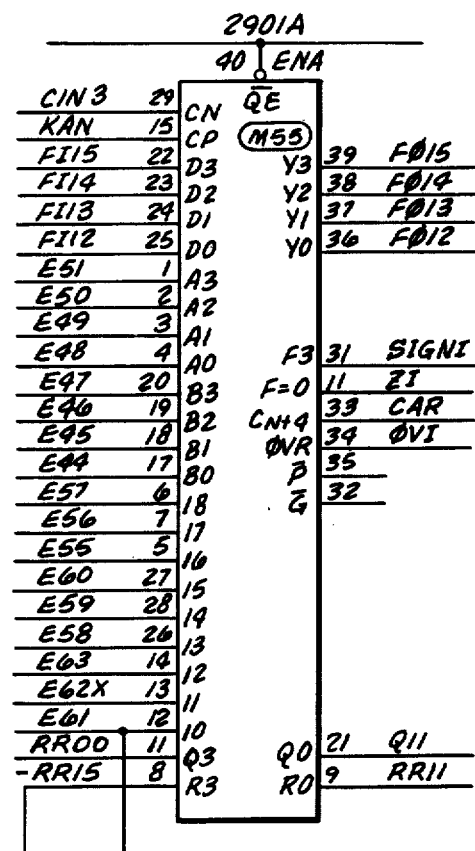
FIG. 9 is a circuit diagram of the hardware multiplier.

The hardware multiply schematic is shown in FIG. 9. There are a total of eight parts, but because of redundancy, only two, C28 and C13 are shown. The input bits are received from the MC register (104 in FIG. 2B) on lines MC00 through MC15 and from the MB register on lines MB00 through MB15. The most significant 16 bits of the double precision output are output on lines SMA00 through SMA15 to the MA register and the least significant 16 bits are output on lines SMB00 through SMB15 to the MB register.

FIGS. 10A, 10B and 10C are schematics of the MA, MB and MC registers. The MB register receives its input either from the FO bus or from the least significant 16 bits of the hardware multiplier output on lines F000 through F015 and outputs to the FI bus or the hardware multiplier on lines FI00 through FI15. The MA register B03 receives the most significant sixteen output bits from the hardware multiplier on lines SMA00 through SMA15 and outputs to the FI bus on lines FI00 through FI15 through an intermediate buffer D03. The MC register B42 receives data from the FO bus on lines FO00 through FO15 and supplies data to the hardware multiplier on lines MC00 through MC15.

Figure 11:
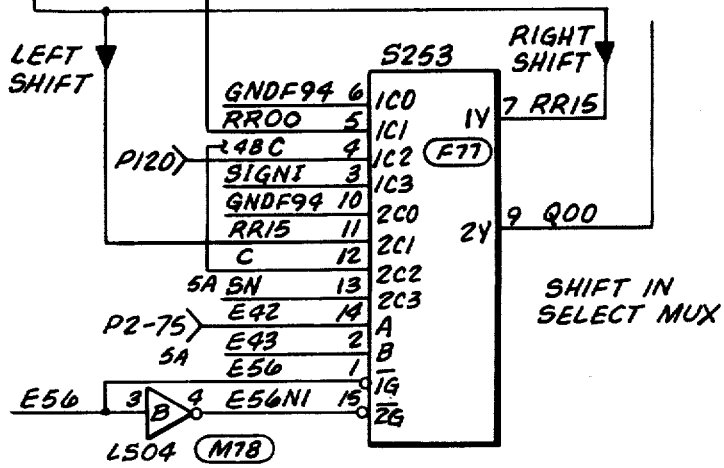
FIG. 11 is a circuit diagram of the arithmetic logic unit and shift logic.

FIG. 11 is one of four AM2901A microprocessor chips and represents, in schematic form, a four bit slice of the CPU. The major inputs and outputs are described below. For additional details, see the Advanced Micro Devices, AM2901A specification sheet.

The carry input is received on CIN1 through CIN4 as generated by the carry in logic 94 of FIG. 2B. The sixteen bit input is received from the FI bus on lines FI00 through FI15. The registers are controlled by the "E" lines which are control lines from the E register 79 of FIG. 2A, the E register being the register that receives the 64 bit control word from the control memory 80 of FIG. 2A. Internal to the AM2901A part, there are R and Q registers as shown in FIG. 2B, which need an external circuit, not shown in FIG. 2B, to complete the shift function. This circuit comprises multiplexer F77 of FIG. 11. The most and least significant bits of the combined 16 bit CPU, RR00 and RR15, are coupled through part F77 which is a dual multiplexer under control of the control memory through lines E42, E43 and E46. To accomplish a circular right shift, the upper half of multiplexer F77 receives the R00 bit from the least significant 4 bit slice, not shown, and loads it onto the MSB line RR15. To accomplish a circular left shift, the lower half of multiplexer F77 receives the MSB from line RR15 and loads it onto line Q00 of the least significant 4 bit slice, now shown. In this way, the shift operation between the Q and R registers are coordinated.

Other inputs to the multiplexer F77 allow carry, zero and sign bits to be shifted in, all under the control of the control memory through lines E42, E43 and E46. The data output of the 4 bit slice of the CPU M55 is applied to the FO bus on lines F000 through F015, and the remaining sign, carry and overflow bits are output for external use. The carry-in select multiplexer B77, under control of control lines E53 and E54, determines which carry input shall be applied to the CPU.

FIG. 12 is the schematic diagram of a six bit slice of the E register which receives and holds the 48 most significant bits of the control memory output. and which drives the control lines which control the operation of the various parts of the microprocessor. The inputs are received from the control memory PROMs on lines R16 through R63 and are output on lines E16 through E67.

The RI,503 and RO,Q18 registers on FIG. 13A and FIG. 13B correspond to the RI register 69 and the RO register 71 of FIG. 2A. Sixteen bits of data are coupled from the FO bus on lines F000 to F015 through the RO register to the main memory on lines R000 through R015. Similarly, sixteen data bits are coupled from main memory on lines RI00 through RI15 through the RI register to the FI bus on lines FI00 through FI15.

The circuits described above comprise a detailed description of one embodiment of a microprocessor which uses modulo addressing and a two bus structure for the real time high speed reduction of data. These circuits are one embodiment of the invention. However, other technologies, such as ECL, and other arrangements of microprocessor elements within a two bus structure could have been used.

The above described embodiments of this invention are merely descriptive of its principles and are not to be considered limiting. The scope of this invention instead shall be determined from the scope of the following claims, including their equivalents.

What is claimed is:

1. An apparatus for generating addresses, said apparatus coupled to a microprocessor having addressable memory and a clock means for generating clocking signals, said microprocessor adapted for executing instructions for storing and retrieving data words at locations identified by the generated addresses in said addressable memory, said apparatus comprising:
   a. Means for selecting a predetermined range of addresses in said addressable memory during storage or retrieval of data words by said microprocessor initiated by at least one transition one of said clock means signals,
   b. Means for calculating a numerical value representative of at least one of said addresses within said range associated with any particular data word during the execution of an instruction for the storing or retrieving of data words by said microprocessor concurrent with the selection of said range of addresses by said selecting means, initiated by at least one transition of one of said clock means signals, said selecting, and said calculating means operatively connected to said microprocessor and said clock means, said means for calculating including:
      first means for generating a digital value representative of a relative address,
      at least one first register for storing said digital value representative of said relative address during at least one transition of said clocking signal, said register operatively connected to said first generating means,
      second means for generating a digital value representative of an absolute address,
      at least one second register for storing said digital value representative of said absolute address,
      adding means responsive to said clocking signal for adding at least a portion of said digital values of said first and second registers such that the resulting digital value is representative of an address within said selected range of said addresses, said adding means being operatively connected to said registers, and
      wherein said first register is operatively coupled to said first generating means and wherein said second register is operatively coupled to said second generating means, and
   c. means for coupling said numerical value to said microprocessor whereby said microprocessor may access said particular data word associated with said address.

2. An apparatus as described in claim 1 wherein said means for selecting said range of addresses comprises:

a. instruction means for generating a digital value representative of an instruction,
b. at least one instruction register for storing said digital value representative of an instruction, operatively connected to said instruction means, and
c. means for controlling the number of bits of said digital values stored in said first and second registers added by said adding means, responsive to said instruction digital value upon at least one transition of said clocking signal said controlling means operatively connected to said instruction means and said clock means.

3. An apparatus as described in claim 2 further comprising:
means for combining the result of the bits added by said adding means and the unadded bits of said second register to form a complete address upon at least one transition of said clocking signal, said combining means operatively connected to said first and second registers.

4. An apparatus as described in claim 3 further comprising:
a. third means for generating a relative address offset value, and
b. a third register for storing said relative address offset value to be added by said adding means with said first and second register values for generating an address other than a next sequential address, said third register operatively connected to said adding means and said third generating means.

5. An apparatus as described in claim 4 wherein said third register is part of said instruction register.

6. An apparatus as described in claim 2 wherein said selecting means designates any $2^n$ number of addresses for said range of addresses where n is any positive integer.

7. An apparatus as described in claim 2 wherein said means for controlling the number of bits added comprises:
(a) at least one first multiplexer for selecting the least significant bits of said first register for coupling to said adding means such that the maximum value of said bits plus one corresponds to the maximum number of addresses of said range of addresses selected by said selecting means, and
(b) at least one second multiplexer for selecting the least significant bits of said second register for coupling to said adding means such that maximum value of said bits plus one corresponds maximum number of addresses of said range of addresses selected by said selecting means, said multiplexer each operatively coupled to said first and second registers.

8. An apparatus as described in claim 1 wherein said adding means is a modulo adder and said calculated one of said addresses is formed in accordance with the following relation:

$$A = b(2^m - 2^n) + \mathrm{mod}(b+i,\ 2^n)$$

where A is the resultant address, $b\,(2^m - 2^n)$ is the number of upper bit positions m-n of said second register, b denoting second register bits, and $\mathrm{mod}\,(b+i,\ 2^n)$ is the modulo $2^n$ sum of said digital values stored in said second and first register, i denoting first register bits.

9. An address generation apparatus in a micro-processor comprising:
a. clock means for generating a clocking signal;
b. a base register for storing a base address defining an initial address in a sequence of addresses,
c. an index register for storing an address increment,
d. means for incrementing said index register by a predetermined value during at least one transition of said clocking signal operatively connected to said index register,
e. means for adding selected bits of said index register and said base register to produce a portion of an indexed address, said adding means operatively connected to said registers, during at least one transition of said clocking signal,
f. means for combining unselected bits of said base register and the resultant portion of said indexed address to form a complete indexed address, during at least one transition of said clocking signal, operatively connected to said base and index registers and said adding means,
g. means for selectably altering the value by which said indexed address is incremented, operatively connected to said incrementing means, and
h. means for selecting which of said selected bits of said index and base registers are added by said adding means during at least one transition of said clocking signal, said bit selecting means operatively connected to said registers and said adding means and said clock means.

10. An address generation apparatus as described in claim 9 wherein said means for adding selected bits of said registers comprises:
(a) means for selecting a range of addresses relative to said initial address, during the transition of at least one clock cycle,
(b) means for selecting the number of least significant bits of said registers the maximum value of which corresponds to the maximum number of the range of addresses selecting during at least one transition of said clocking signal, and
(c) an adder for adding such selected bits from each register together to form the least significant portion of a computed address within said range of addresses, said adder and said selecting means being operatively connected.

11. An address generation apparatus as described in claim 10 wherein said combining means comprises:
at least one multiplexer which selects the bits of said base register not selected by said least significant bit selecting means forming the upper portion of said address and which selects the added computed bits of said adder forming the lower portion of said computed address, whereby the complete computed address is formed, said multiplexer operatively connected to said registers.

12. An address generation apparatus as described in claim 11 wherein the relationship between said selected bits and the maximum number of addresses selected is defined by the relation $$a = 2^n$$

where n is a positive integer representing the number of binary bits selected and a is the number of addresses selected.

13. An address generation apparatus as described in claim 11 wherein said least significant bit selecting means comprises:
(a) an instruction register for receiving instructions having a control field, and (b) means for coupling the contents of said control field to said multiplexer on at least one transition of said clocking signal to control the selection of bits by said multiplexer operatively interconnecting said multiplexer with said instruction register, whereby said multiplexer selects bits in accordance with the contents of said control field.

14. An address generation apparatus as described in claim 12 where n is an integer of the set of positive numbers 4, 5, 6 and 7, whereby the number of addresses selected are 16, 32, 64 or 128.

* * * * *